United States Patent [19]

Suehiro et al.

[11] Patent Number: 4,858,016

[45] Date of Patent: Aug. 15, 1989

[54] CATHODE RAY TUBE HAVING AN IMPROVED IMPLOSION PROOF STRUCTURE

[75] Inventors: Tsutomu Suehiro, Kanagawa; Hitoshi Uchiyama, Tokyo; Takahito Inukai, Tokyo; Tsunenari Saito, Tokyo, all of Japan

[73] Assignee: Sony Corporation, Tokyo, Japan

[21] Appl. No.: 165,009

[22] Filed: Mar. 7, 1988

[30] Foreign Application Priority Data

Mar. 11, 1987 [JP] Japan ................................ 62-056062

[51] Int. Cl.$^4$ ................................................ H04N 9/07

[52] U.S. Cl. ..................................... 358/246; 358/245; 220/2.1 A

[58] Field of Search ............................... 358/245, 246; 220/2.1 A

[56] References Cited

U.S. PATENT DOCUMENTS

| | | | |
|---|---|---|---|
| 3,412,203 | 8/1965 | D'Angelo | 220/2.1 A |
| 3,576,395 | 4/1971 | Arrington | 358/245 |
| 3,867,668 | 2/1975 | Shrader | 358/245 |
| 3,912,104 | 10/1975 | Schwartz | 220/2.1 A |
| 4,004,092 | 1/1977 | Rogers | 220/2.1 A |
| 4,295,574 | 10/1981 | Nakazima | 358/256 |
| 4,432,018 | 2/1984 | Futatsudera | 358/246 |
| 4,621,294 | 11/1986 | Lee | 220/2.1 A |
| 4,701,802 | 10/1987 | Omae | 358/246 |

FOREIGN PATENT DOCUMENTS

| | | | |
|---|---|---|---|
| 0111048 | 8/1980 | Japan | 358/246 |
| 1069330 | 5/1967 | United Kingdom . | |
| 1338244 | 11/1973 | United Kingdom . | |
| 1480635 | 7/1977 | United Kingdom . | |

*Primary Examiner*—James J. Groody
*Assistant Examiner*—Jerome Grant
*Attorney, Agent, or Firm*—Hill, Van Santen, Steadman & Simpson

[57] ABSTRACT

A cathode ray tube having a tube envelope, an anti-explosion band wrapped around the tube envelope, the band having parallel upper and lower arm portions and parallel left and right arm portions, rear extension portions extending rearwardly from the upper and lower arm portions, and degaussing coils secured to the rear extension portions. The structure is such that an external magnetic shield member used in the prior art can be omitted so that the manufacturing process for the cathode ray tube is simplified and the manufacturing cost is reduced.

8 Claims, 5 Drawing Sheets

CATHODE RAY TUBE HAVING AN IMPROVED IMPLOSION PROOF STRUCTURE

BACKGROUND OF THE INVENTION

1. Field of the Invention

The present invention is in the field of cathode ray tubes with an improved implosion protection device.

2. Description of the Prior Art

The tube envelope of a cathode ray tube is compressed inwardly by atmospheric pressure so that when it is broken by an external shock or the like, the tube envelope is cracked into pieces and the pieces may be scattered substantially by the explosion. In order to prevent such an occurrence, prior art, as shown in FIG. 1 provides a tube envelope 1 which is reinforced near its panel portion, the weak point from a structural standpoint, by an anti-explosion band made of metal.

In a color cathode ray tube, a magnetic field may affect the electron beam to change its path so that the color purity of the color cathode ray tube is deteriorated. To avoid this effect, as shown in FIG. 1, the tube envelope 1 may be partly covered with an external magnetic shield member 6, to which there may be attached a degaussing coil 4. An alternating, attenuating current is flowed through the degaussing coil 4 and the current passing therethrough is gradually decreased to carry out the degaussing operation. The external magnetic shield member 6 is secured to the tube envelope 1 as follows. The external magnetic shield member 6 is inserted to cover the tube envelope from its neck-down portion and then is secured to the cabinet (not shown) together with the anti-explosion band by screws at attaching portions 5.

Alternatively, after the external magnetic shield member 6 is assembled to the cabinet, the tube envelope 1 is inserted therein and then the attaching portions 5 of the anti-explosion band mounted on the tube envelope are secured to the cabinet by means of screws.

The above described conventional cathode ray tube has an anti-explosion function and means for decreasing the influence of external magnetic fields, but it would be desirable if the number of assembly parts would be decreased, so that the number of manufacturing process steps and the manufacturing costs thereof could be reduced.

SUMMARY OF THE INVENTION

The present invention provides an improved cathode ray tube wherein the color purity can be protected from deterioration by an external magnetic field. The tube of the present invention has a reduced number of assembly parts leading to a reduced manufacturing cost.

In accordance with the present invention there is provided a cathode ray tube which includes:

(a) a tube envelope, (b) an anti-explosion band wrapped around the tube envelope;

(c) rear extension portions extending rearwardly from upper and lower arm portions of the anti-explosion band; and (d) degaussing coils secured to the rear extension portions.

Other objects, features and advantages of the present invention will become apparent from the following detailed description of illustrative embodiments, in which like reference numerals identify the same or similar parts.

DESCRIPTION OF THE PREFERRED EMBODIMENTS

The present invention will be described with reference to FIGS. 2 to 5 of the drawings.

Figure 2:
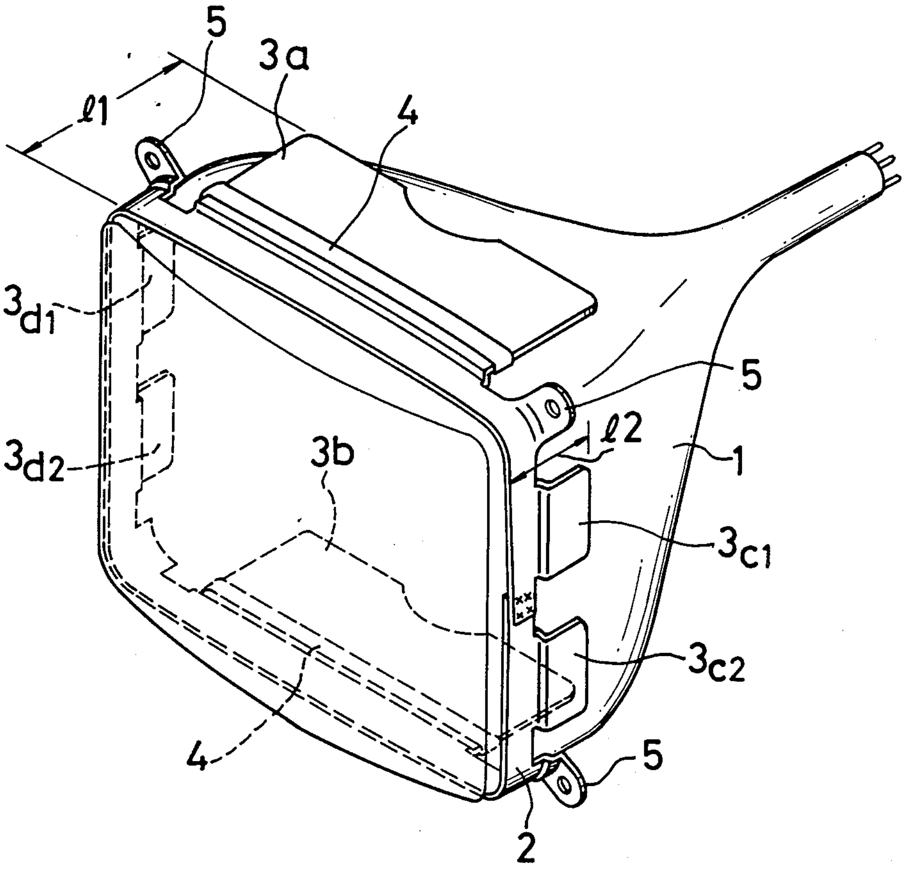
FIGS. 2 to 5 are perspective views illustrating embodiments of cathode ray tubes according to the present invention.

FIG. 2 is a perspective view showing an embodiment including a tube envelope 1 of the color cathode ray tube, in which an aperture grille is employed as a color selection electrode. A metal reinforcing band, i.e., an anti-explosion band engages the tube, the anti-explosion band being formed of metal by the so-called heat shrink process. The metal anti-explosion band 2 is provided at its four corners with integral attaching portions 5 by which the metal band 2 is secured to a cabinet (not shown). The anti-explosion band has parallel upper and lower arm portions and left and right arm portions as shown. From these arm portions there are elongated integrally extending rear extension portions 3 (3*a*, 3*b*, $3_{c1}$, $3_{c2}$, $3_{d1}$ and $3_{d2}$) which extend rearwardly or to the neck portion. Degaussing coils 4 are directly secured to the upper and lower extension portions 3*a* and 3*b*, respectively. In this embodiment, the length l1 of the upper and lower rear portions 3*a*, 3*b* is made longer than the length l2 of the right and left rear extension portions $3_{c1}$, $3_{c2}$, and $3_{d1}$, $3_{d2}$. For example, in a 14-inch size cathode ray tube, the length l1 of the upper and lower rear extension portions 3*a*, 3*b* can be about 90 mm and the length l2 of the right and left rear extension portions $3_{c1}$, $3_{c2}$ and $3_{d1}$, $3_{d2}$ can be about 50 mm.

Figure 1:
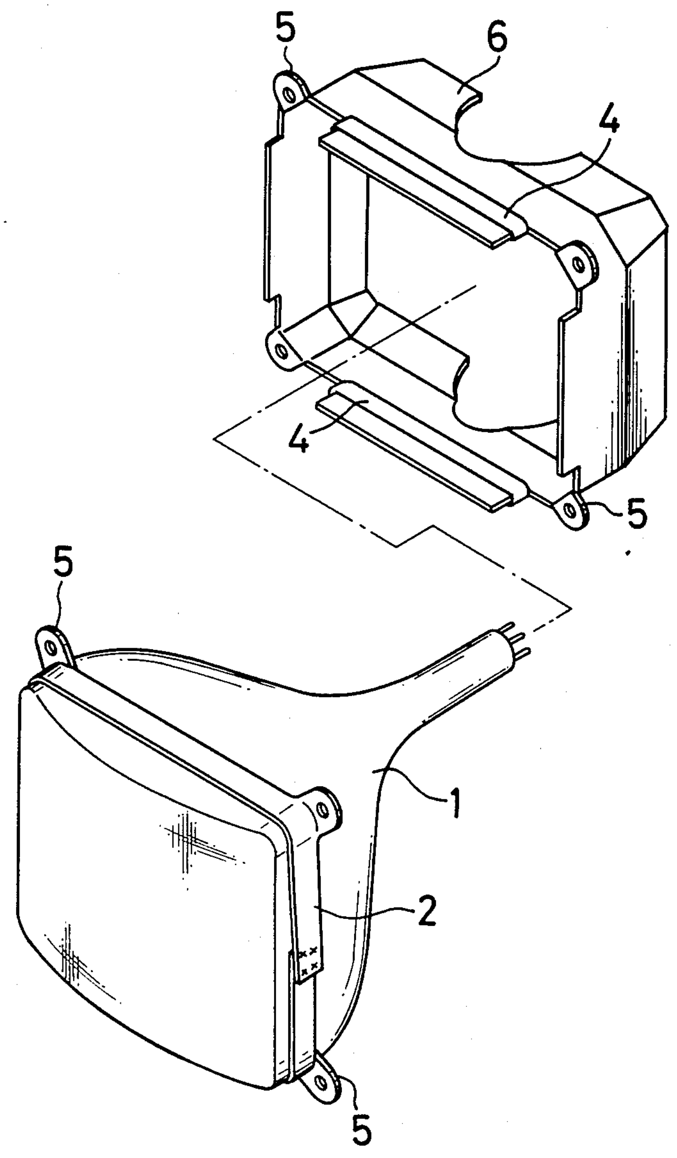
FIG. 1 (PRIOR ART)
FIG. 1 is perspective view illustrating an example of a conventional cathode ray tube.

With this arrangement, the rear extension portion 3 which is formed integrally with the anti-explosion band 2 functions as a part of the magnetic circuit which degausses the parts within the tube envelope 1, particularly, the aperture grille and the frame thereof by flowing an alternating attenuating current through the degaussing coil 4. Also, the rear extension portion 3 functions as an external magnetic shield member. It was experimentally confirmed that the correction of drift caused by terrestrial magnetism in the improved color cathode ray tube is substantially th same as that of the conventional color cathode ray tube having an external magnetic shield member 6 and the anti-explosion band 2 shown in FIG. 1.

Thus, according to the present invention, the conventional external magnetic shield member 6 which is formed independently of the anti-explosion band 2 is omitted so that the number of assembly parts is reduced, thus reducing the manufacturing costs. Further, the conventional step of securing the external magnetic shield member 6 is not required so that the number of manufacturing process steps can be reduced.

Figure 3:
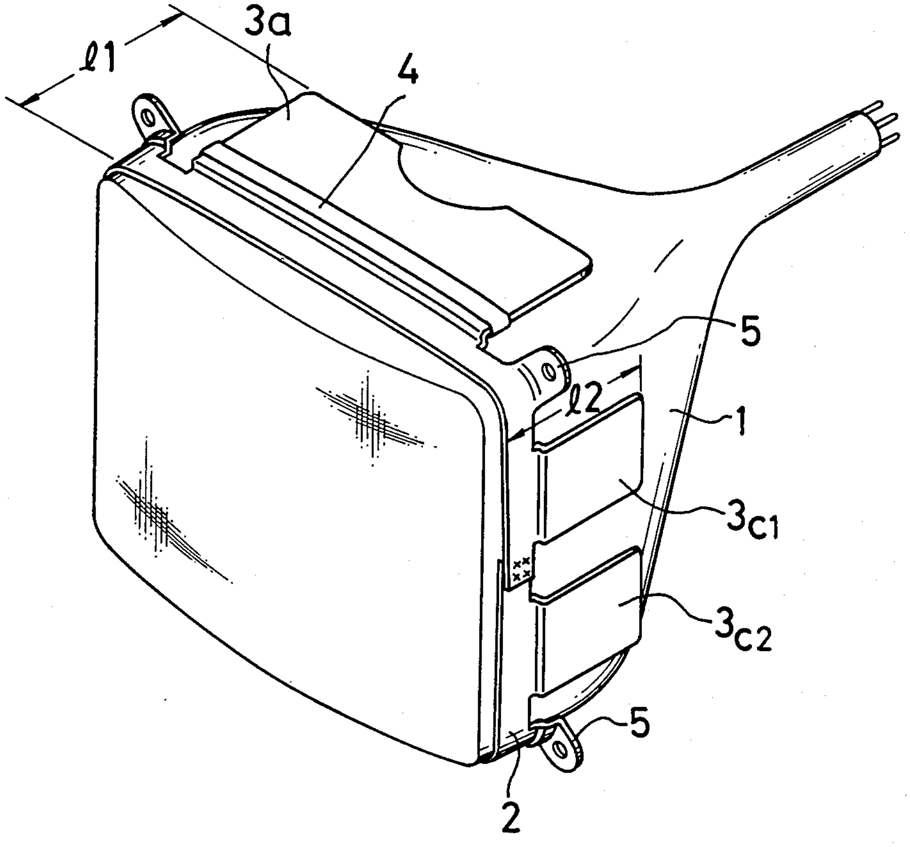

In the arrangement shown in FIG. 2, the length l2 of the right and left extension portions $3_{c1}$, $3_{c2}$, and $3_{d1}$, $3_{d2}$, is made shorter than the length l1 of the upper and lower rear extension portions 3*a*, 3*b*. The length l1 of the upper and lower rear extension portions 3*a*, 3*b*, and the length l2 of the right and left rear extension portions $3_{c1}$, $3_{c2}$, and $3_{d1}$, $3_{d2}$ can also be the same as shown in FIG. 3.

Figure 4:
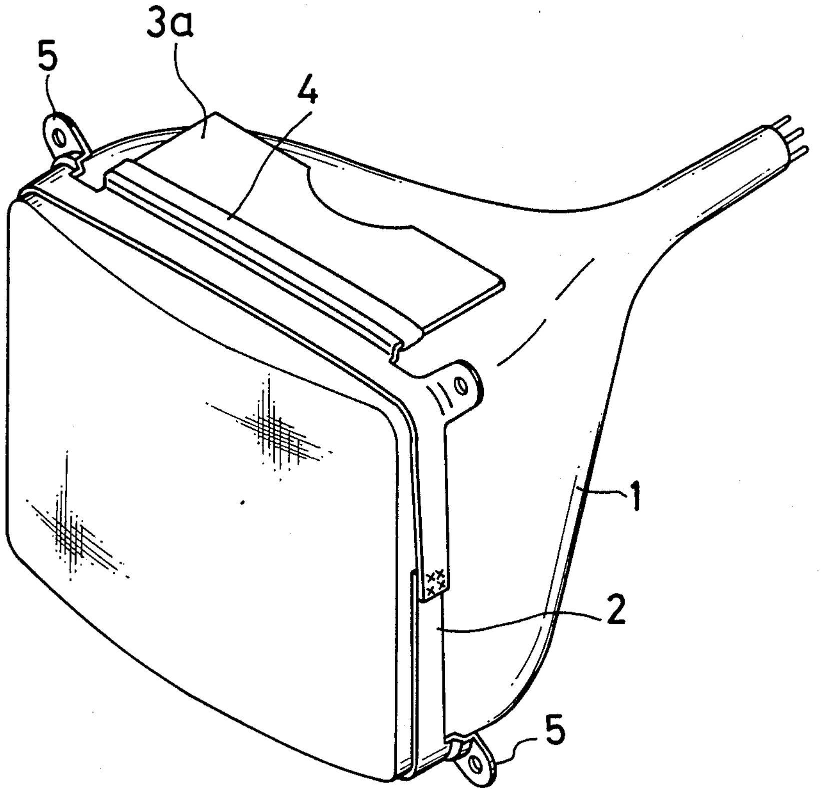

Since the rear extension portions at the right and left rear extension portions $3_{c1}$, $3_{c2}$, and $3_{d1}$, $3_{d2}$ do not contribute to the degaussing effect by the coil 4 significantly, the following variation is possible, as shown in FIG. 4. The rear extension portions are not formed on the right and left arm portions of the anti-explosion band 2 but the rear extension portions 3*a*, 3*b* are formed only on the upper and lower arm portions to which the degaussing coils 4 are secured.

Figure 5:
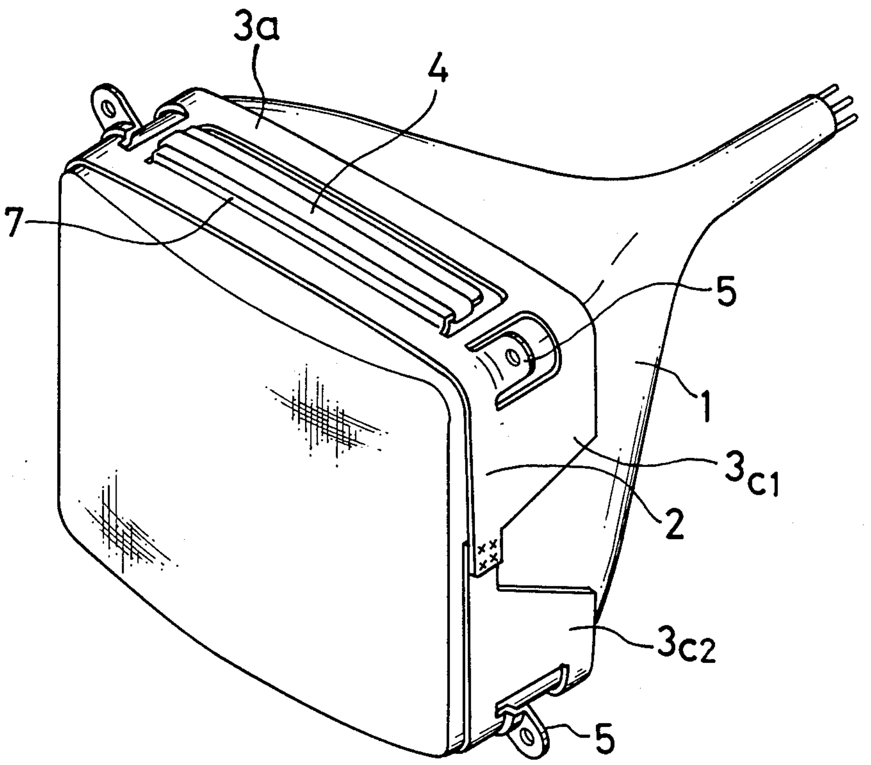

A further modification is shown in FIG. 5 wherein the upper and lower rear extension portions 3*a*, 3*b* are respectively continuous with the left and right rear extension portions $3_{c1}$, $3_{d1}$, and $3_{c2}$, $3_{d2}$. One portion of each of the upper and lower rear extension portions 3*a*, 3*b* is cut to form a tongue portion 7 to which there is secured the degaussing coil 4. In this structure, the corner portions of the rear extension portion 3 are all closed so that when the degaussing is carried out by flowing the current through the degaussing coil 4, the magnetic flux can be concentrated at the corner portions of the aperture grille and the frame, thus increasing the degaussing effect.

According to the present invention, the degaussing coils 4 are directly mounted on the rear extension portions 3*a*, 3*b* which are integrally formed on the upper and lower arm portions of the metal anti-explosion band 2 wrapped around the tube envelope 1. The rear extension portions $3_{c1}$, $3_{c2}$, and $3_{d1}$, $3_{d2}$ may be provided at the right and left arm portions of the anti-explosion band 2.

It is desirable that the length of the upper and lower rear extension portions 3*a*, 3*b* be relatively longer. In practice, the length may be preferably about one half the length between the seal line of the front panel with the funnel portion and the boundary of the funnel portion with the neck, that is, the so-called reference point.

The anti-explosion band may be a heat shrink band, a tension band, or the like.

According to the present invention, the rear extension portion 3 integrally formed with the anti-explosion band functions as a part of a magnetic circuit when the demagnetization of the color selection electrode within the tube envelope 1 (the frame and grille element in the case of the aperture grille) so that the demagnetization is effectively performed by the degaussing coil 4. The rear extension portion 3 functions as an external magnetic shield member, as described above.

According to the present invention, it was confirmed that the rear extension portions 3*a*, 3*b* of the upper and lower arm portions can bring about a high degaussing effect but the rear extension portion $3_{c1}$, $3_{c2}$ and $3_{d1}$, $3_{d2}$ of the right and left arm portions do not contribute to the degaussing effect substantially. As to the improvement of drift due to terrestrial magnetism, the color cathode ray tube of the present invention has substantially the same improvement as that of the known cathode ray tube having an external magnetic shield member, and the deterioration of the color purity caused by the magnetic field can be improved.

According to the present invention, the conventional external magnetic shield member can be omitted. Hence, the process of assembly of the external magnetic shield member is not required and only the anti-explosion band 2 is wrapped around the tube envelope 1. Thus the number of manufacturing process steps for the color cathode ray tube can be reduced.

Since the degaussing coils are mounted on the upper and lower rear extension portions which are integrally formed with the upper and lower arm portions of the anti-explosion band, the deterioration of color purity caused by the magnetic field can be lessened. At the same time, since the external magnetic shield member employed in the prior art is omitted, the number of assembly parts can be reduced and the manufacturing costs can therefore be reduced.

It will be understood that the above description is given on the basis of preferred embodiments of the invention and it will be apparent that many modifications and variations could be effected by one with ordinary skill in the art without departing from the spirit and scope of the novel concepts of the invention so that the scope of the invention should be determined only by the appended claims.

I claim as my invention:

1. A cathode ray tube comprising:

a tube envelope, an anti-explosion band wrapped around said tube envelope and having parallel upper and lower arm portions and parallel left and right arm portions, rear extension portions extending rearwardly from said band at said upper and lower arm portions, and degaussing coils secured to said rear extension portions.

2. A cathode ray tube according to claim 1 wherein said rear extension portions are integral with said upper and lower arm portions.

3. A cathode ray tube according to claim 1 which further includes rear extension portions extending rearwardly from said left and right arm portions.

4. A cathode ray tube according to claim 3 wherein the length of the rear extension portions of the upper and lower arm portions is greater than the rear extension portions of the left and right arm portions.

5. A cathode ray tube according to claim 4 wherein the length of the rear extension portions of the upper and lower arm portions is about 90 mm and the length of the rear extension portions of said left and right arm portions is about 50 mm for a 14-inch size cathode ray tube.

6. A cathode ray tube according to claim 3 wherein the length of the rear extension portions of said upper and lower arm portions is substantially equal to that of said rear extension portions of said left and right arm portions.

7. A cathode ray tube according to claim 3 wherein the rear extension portions of said upper and lower arm portions are formed integrally with the rear extension portions of the left and right arm portions.

8. A cathode ray tube according to claim 1, wherein said degaussing coils are oriented on said rear extension portions so that the axes of said coils are parallel to the forward-rearward direction of said extension portions.

* * * * *